United States Patent
Filshill et al.

(10) Patent No.: US 10,900,188 B2
(45) Date of Patent: Jan. 26, 2021

(54) LIGHTWEIGHT-FOAMED GLASS AGGREGATES FOR VAPORIZATION SUPPRESSION

(71) Applicant: AERO AGGREGATES OF NORTH AMERICA LLC, Eddystone, PA (US)

(72) Inventors: Archibald Stewart Filshill, Huntingdon Valley, PA (US); Thomas Liam McGrath, Huntingdon Valley, PA (US)

(73) Assignee: AERO AGGREGATES OF NORTH AMERICA, LLC, Eddystone, PA (US)

( * ) Notice: Subject to any disclaimer, the term of this patent is extended or adjusted under 35 U.S.C. 154(b) by 0 days.

(21) Appl. No.: 16/612,995

(22) PCT Filed: May 11, 2018

(86) PCT No.: PCT/US2018/032183
§ 371 (c)(1),
(2) Date: Nov. 12, 2019

(87) PCT Pub. No.: WO2018/209162
PCT Pub. Date: Nov. 15, 2018

(65) Prior Publication Data
US 2020/0199014 A1  Jun. 25, 2020

Related U.S. Application Data

(60) Provisional application No. 62/505,210, filed on May 12, 2017.

(51) Int. Cl.
*E02B 15/06* (2006.01)
*C03C 11/00* (2006.01)
*C03C 12/00* (2006.01)

(52) U.S. Cl.
CPC ............ *E02B 15/06* (2013.01); *C03C 11/007* (2013.01); *C03C 12/00* (2013.01)

(58) Field of Classification Search
CPC .................................. E02B 3/16; E02B 15/06
(Continued)

(56) References Cited

U.S. PATENT DOCUMENTS 3,592,009 A * 7/1971 Glijnis .................. B65D 88/76
405/53
3,698,850 A * 10/1972 Sparlin .................. C02F 1/681
431/8

(Continued)

FOREIGN PATENT DOCUMENTS

JP  2007-029125 A  2/2007

*Primary Examiner* — Frederick L Lagman
(74) *Attorney, Agent, or Firm* — Condo Roccia Koptiw LLP

(57) ABSTRACT

Systems and methods are disclosed for vaporization suppression. Vaporization suppression may include, for example, evaporation control and/or odor control. A layer of foam glass aggregates may be placed on a body of water. Bodies of water may include natural and man-made aqueous bodies (such as, for example, ponds, lakes, lagoons, reservoirs, tanks, pools, runoff areas, etc.). Water may include clean water, natural water, rainwater, runoff, industrial output, manure slurries, leachates, treatment effuse, etc.). When placed, the foam glass aggregates in contact with the water may have a first moisture content. At equilibrium, the foam glass aggregates in contact with the water may have a second moisture content. The second moisture content may be greater than the first moisture content. The foam glass aggregates in contact with the water may have a bulk density at the second moisture content that is sufficient to maintain buoyancy at the surface of the body of water.

20 Claims, 4 Drawing Sheets

(58) Field of Classification Search
USPC .............................. 405/62, 63; 239/2.1; 4/498
See application file for complete search history.

(56) References Cited

U.S. PATENT DOCUMENTS

| | | | |
|---|---|---|---|
| 3,843,306 A * | 10/1974 | Whittington | C02F 1/681 |
| | | | 431/8 |
| RE30,146 E * | 11/1979 | Dial | B65D 88/76 |
| | | | 220/216 |
| 4,359,096 A | 11/1982 | Berger et al. | |
| 4,429,683 A * | 2/1984 | Hull | F24S 10/13 |
| | | | 126/567 |
| 6,357,964 B1 * | 3/2002 | DeGarie | B09B 1/004 |
| | | | 220/216 |
| 2003/0222025 A1 * | 12/2003 | Archuleta | B01J 20/28042 |
| | | | 210/691 |
| 2009/0321089 A1 | 12/2009 | Gibbs et al. | |
| 2010/0308124 A1 * | 12/2010 | Murakami | B01D 1/22 |
| | | | 239/2.1 |
| 2012/0024971 A1 * | 2/2012 | Field | E02B 3/00 |
| | | | 239/2.1 |
| 2016/0166867 A1 | 6/2016 | Hansen et al. | |
| 2016/0250505 A1 | 9/2016 | Badger et al. | |

\* cited by examiner

LIGHTWEIGHT-FOAMED GLASS AGGREGATES FOR VAPORIZATION SUPPRESSION

CROSS-REFERENCE TO RELATED APPLICATIONS

This application is a National Stage Entry under 35 U.S.C. § 371 of Patent Cooperation Treaty Application No. PCT/US2018/032183, filed May 11, 2018, which claims the benefit of provisional U.S. patent application Ser. No. 62/505,210, filed May 12, 2017, the disclosure of which is incorporated herein by reference in its entirety.

BACKGROUND

Evaporation control is an important consideration in areas experiencing drought. Non-permeable membranes may be used to cover bodies of water, however, these are undesirable due to potential build up of gases beneath the non-permeable membrane, and, if any rainfall does occur, the rainfall is trapped on top of the non-permeable membrane. Permeable membranes might be used; however, even permeable membranes have drawbacks—UV degradation, inability to adapt to changing water levels, criticism for not being an environmentally friendly material, etc.

Thus, what is needed are improved systems and methods for evaporation control on bodies of water.

SUMMARY

Systems and methods are disclosed for vaporization suppression. Vaporization suppression may include, for example, evaporation control and/or odor control. A layer of foam glass aggregates may be placed on a body of water. Bodies of water may include natural and man-made aqueous bodies (such as, for example, ponds, lakes, lagoons, reservoirs, tanks, pools, runoff areas, etc.). Water may include clean water, natural water, rainwater, runoff, industrial output, manure slurries, leachates, treatment effuse, etc.). When placed, the foam glass aggregates in contact with the water may have a first moisture content. At equilibrium, the foam glass aggregates in contact with the water may have a second moisture content. The second moisture content may be greater than the first moisture content. The foam glass aggregates in contact with the water may have a bulk density at the second moisture content that is sufficient to maintain buoyancy at the surface of the body of water.

DETAILED DESCRIPTION

Figure 1:
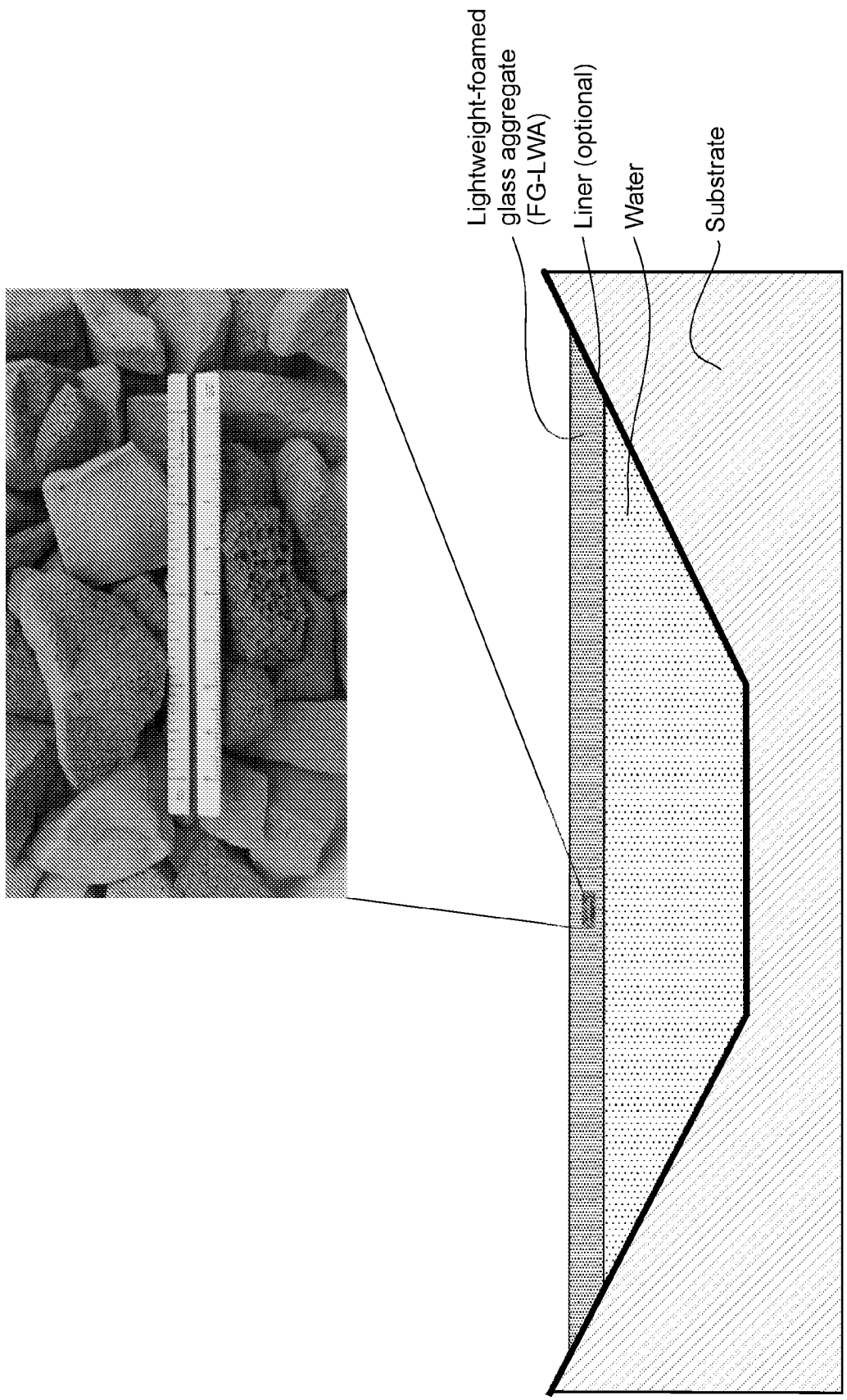
FIG. 1 depicts foam glass aggregates, such as lightweight-foamed glass aggregate (FG-LWA), disposed on a body of water.

FIG. 1 depicts foam glass aggregates, such as lightweight-foamed glass aggregates (FG-LWA), disposed on a body of water. FG-LWA is an inert, stable, and environmentally friendly substrate. Typically, to form FG-LWA, recycled glass is cleaned, ground, mixed with a foaming agent, heated, and allowed to fragment from temperature shock. The resulting aggregate is cellular, with a relatively low bulk density, but relatively high durability. FG-LWA has many uses, for example, as a lightweight fill for construction applications, vehicle arrestor beds, building insulation, etc. However, since FG-LWA provides an important economic driver for glass recycling, finding new uses and applications for FG-LWA is extremely desirable.

Water may include clean water, natural water, influent, effluent, rainwater, runoff, industrial output, manure slurries (e.g., manure storage structures), leachates, treatment effuse (e.g., waste retention ponds), etc. Although depicted as a ground level body, bodies of water may include natural and man-made aqueous bodies (such as, for example, ponds, lakes, lagoons, reservoirs, tanks, pools, runoff areas, etc.). The substrate may be natural or man-made. Accordingly, the substrate could be tank walls, etc. Examples of bodies of water may include a lagoon for waste retention, an agricultural run-off area, mine tailings water, or a water storage reservoir.

An optional liner may be disposed between the water and the substrate, such as, for example, to prevent water loss through seepage or ground contamination from the water. Suitable liners include those made from reinforced polyethylene, reinforced polypropylene, thermoplastic olefin, ethylene propylene diene monomer, polyvinyl chloride, isobutylene isoprene, butyl rubber, etc.

A layer of FG-LWA may be placed (e.g., deposited) upon the water. The layer of FG-LWA may cover a portion of the surface of the body of water. The layer of FG-LWA may cover the entire surface of the body of water. The layer of FG-LWA may be placed as loose aggregates (e.g., the FG-LWA layer may specifically exclude a cover above the FG-LWA).

The layer FG-LWA may be from about one inch to about twelve inches thick (e.g., deep as measured to water level). The layer FG-LWA may be from about one inch to about six inches thick (e.g., deep as measured to water level). The layer FG-LWA may be from about six inches to about twelve inches thick (e.g., deep as measured to water level).

When placed, the FG-LWA in contact with the water may have a first moisture content. At equilibrium, the FG-LWA in contact with the water may have a second moisture content. The second moisture content may be greater than the first moisture content. The FG-LWA in contact with the water may have a bulk density at the second moisture content that is sufficient to maintain buoyancy at the surface of the body of water. It is understood that depending on the depth (e.g., thickness) of the layer of FG-LWA, upper strata of FG-LWA may reach equilibrium at a moisture content that is different from the second moisture content. For example, depending on the depth (e.g., thickness) of the layer of FG-LWA, there may be a moisture gradient from relative top to relative bottom.

Suitable FG-LWA may be procured from AERO AGGREGATES, LLC, Eddystone, Pa. The FG-LWA may be prepared from a recycled glass cullet. The FG-LWA may be prepared from a sodo-calic glass. As FG-LWA is made up of silica, it may be considered a natural material for regulatory purposes. As FG-LWA is made from recycled glass, it may be considered environmentally friendly. FG-LWA properties include low unit weight, low thermal conductivity, high strength, non-absorbency, non-toxicity, non-leachability, chemical stability, imperviousness to UV degradation, freeze/thaw stability, and fireproofness.

The FG-LWA may be prepared from recycled glass cullet that contains less than 1% borosilicate glass.

The FG-LWA may have a particle size of about 5 mm to about 80 mm. The FG-LWA may have a particle size of about 10 mm to about 60 mm. The FG-LWA may have a bulk density of about 120 kg/m$^3$ to about 400 kg/m$^3$ at the first moisture content. The FG-LWA may have a bulk density of about 170 kg/m$^3$ to about 290 kg/m$^3$ at the first moisture content. The FG-LWA may have a bulk density of about 200 kg/m$^3$ to about 240 kg/m$^3$ at the first moisture content.

The FG-LWA at the surface of the water provides vaporization suppression, such as, for example, evaporation control and/or odor control. Evaporation control is important, for example, in areas of drought, or to prevent any solutes in the water from increasing in concentration, etc. Odor control (e.g., air emission control) is important, for example, for safety, to minimize potential nuisances, and create a better setting for people in proximity to the water.

The FG-LWA at the surface of the water allows rain water, or other falling spray, to pass through the layer of FG-LWA and reach the water. This permeability to rainfall (e.g., precipitation and other falling spray) prevents puddles from collecting (and potentially stagnating or engendering vector control issues) on the surface of the FG-LWA.

The FG-LWA at the surface of the water may prevent vectors from entering the body of water. Examples of vectors include birds (such as, for example, waterfowl). This is beneficial in cases where environmental regulations require a covering of the water (e.g., such as with flowback lagoons, acid tar pits, mine tailings dam waters, etc.) or where waterfowl could lead to contamination of the water (e.g., biosecurity, E. coli, nitrogen/phosphorous nutrients from waste, etc.). The FG-LWA at the surface of the water may prevent mosquitos from breeding.

The FG-LWA at the surface of the water may prevent light from reaching the water. The FG-LWA at the surface of the water may prevent algae growth, e.g., by blocking light required for growth. The FG-LWA at the surface of the water may prevent temperature increases from solar radiation.

The FG-LWA at the surface of the water may have pores to support growth of microbes and bacteria (such as, for example, to aid in water quality amelioration or to create anaerobic conditions below the FG-LWA layer).

The FG-LWA at the surface of the water may be combined with water treatment media (such as, for example steel slag, calcium carbonates, etc.) that removes phosphates and nitrates. In operation, runoff (such as may be caused by rainfall) may cause phosphates and nitrates to be washed from agricultural soils and into the water. The runoff passing through the layer of FG-LWA and water treatment media will stimulate the action of the media when most necessary and efficacious.

Figure 2A:
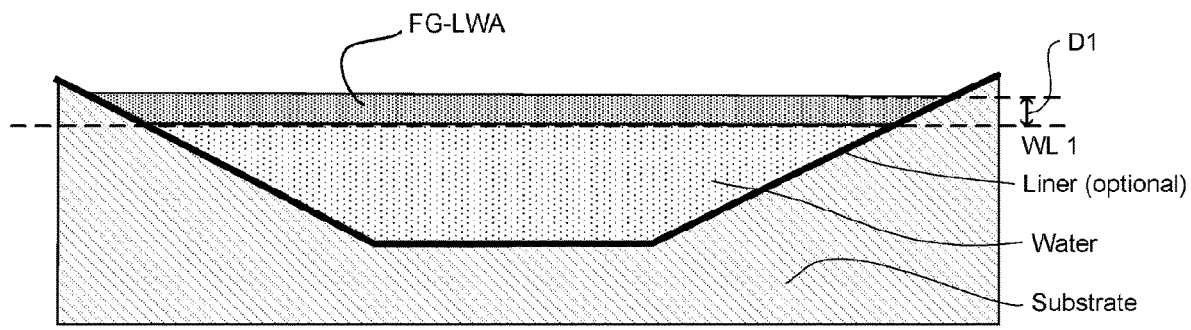
FIG. 2A depicts FG-LWA disposed at a depth over a water level of a body of water.

FIG. 2A depicts a layer of FG-LWA disposed at a depth (D1) over a water level (WL1) of a body of water. The body of water may be substantially similar to that described with respect to FIG. 1. For example, D1 may be from about one inch to about twelve inches, and in some examples, D1 may be from about one inch to about six inches, or, in some other examples, D1 may be from about six inches to about twelve inches.

Figure 2B:
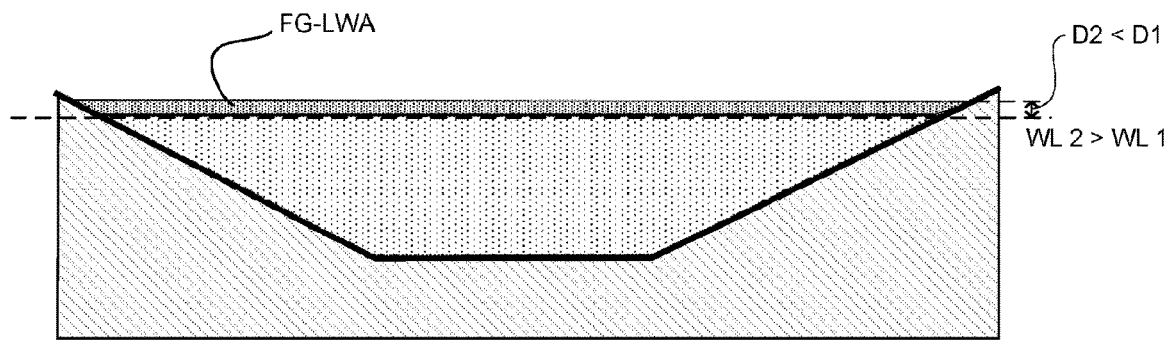
FIG. 2B depicts FG-LWA autonomously adjusting to a new depth over a relatively higher water level of a body of water.

FIG. 2B depicts FG-LWA autonomously adjusting to a new depth (D2) over a relatively higher water level (WL2) of a body of water. For example, the body of water may receive an additional influx of water, such as, for example, from precipitation, controlled addition, overflow, etc. The new water level (WL2) is therefore greater than WL1. The FG-LWA may autonomously spread and cover the entire surface of the body of water. As depicted, the sides of the body of water are slanted relatively outward (e.g., such as is typical in excavated bodies). In this configuration, the new depth (D2) decreases relative to D1 as the FG-LWA spreads out across the larger surface area corresponding to WL2.

Figure 2C:
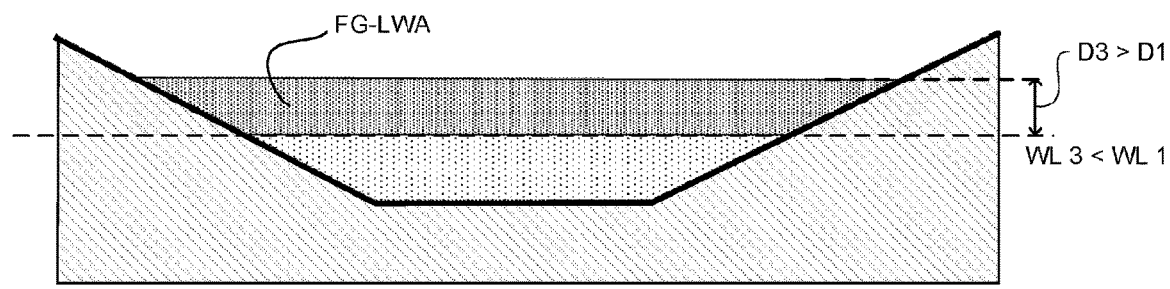
FIG. 2C depicts FG-LWA autonomously adjusting to a new depth over a relatively lower water level of a body of water.

FIG. 2C depicts FG-LWA autonomously adjusting to a new depth (D3) over a relatively lower water level (WL3) of a body of water. For example, the body of water may experience a net loss of water, such as, for example, from seepage, controlled release (e.g., outflow), etc. The new water level (WL3) is therefore less than WL1. The FG-LWA may autonomously coalesce and continue to cover the entire surface of the body of water. As depicted, the sides of the body of water are slanted relatively outward. In this configuration, the new depth (D3) increases relative to D1 as the FG-LWA contracts across the smaller surface area corresponding to WL3.

Figure 3A:
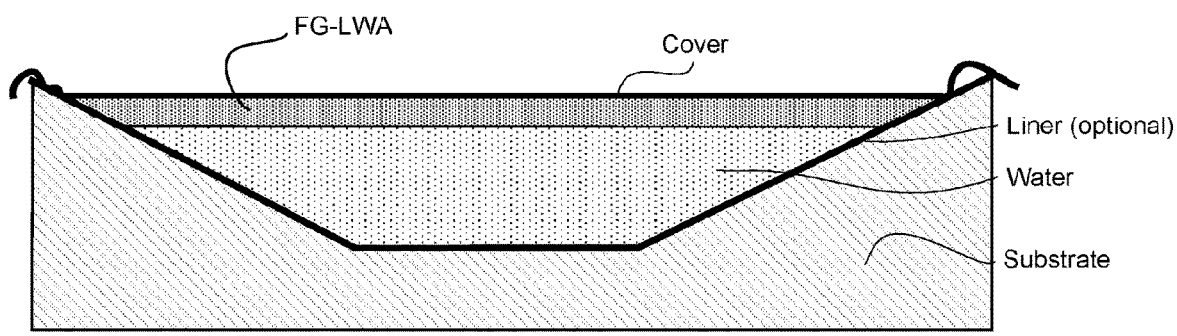
FIG. 3A depicts FG-LWA disposed on a body of water as an intermediate layer.

FIG. 3A depicts FG-LWA disposed on a body of water as an intermediate layer. A cover may be placed over the FG-LWA for covering the FG-LWA (such as, for example, to prevent wind from causing an uneven distribution of FG-LWA). The FG-LWA may have a bulk density at the second moisture content that is sufficient to maintain buoyancy at the surface of the body of water with the addition of the weight of the cover. The cover may be a permeable cover. The cover may be a semi-permeable cover. Examples of covers include nettings, membranes, grids, and/or textiles. Covers may be disposed above the FG-LWA layer, below the FG-LWA layer, or on both sides of the FG-LWA layer. The cover may be only a single layer. The cover may not include soil. The cover may not include plants. The cover may not include soil and plants.

Figure 3B:
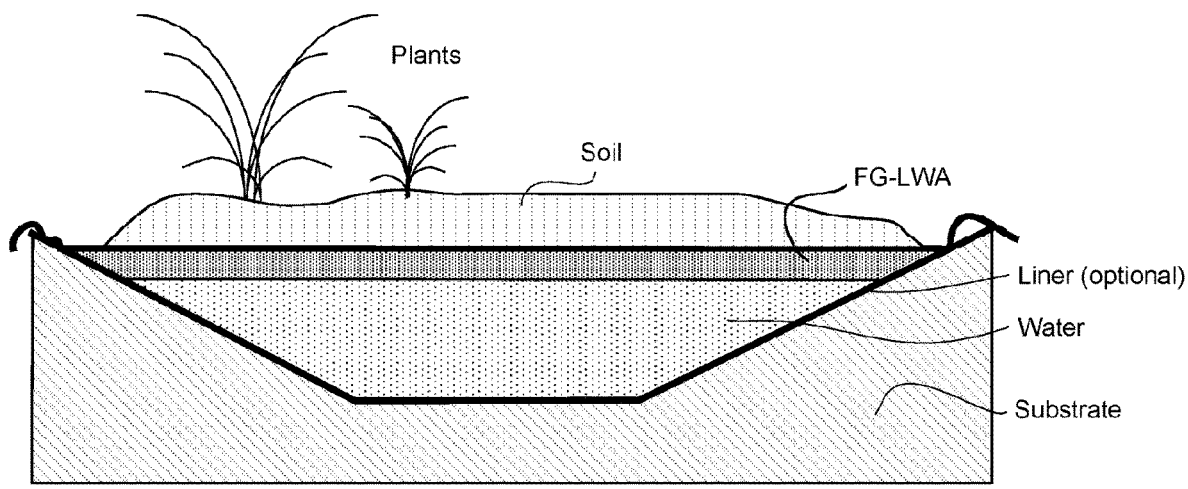
FIG. 3B depicts FG-LWA disposed on a body of water as an intermediate layer.

FIG. 3B depicts an alternative embodiment of FG-LWA disposed on a body of water as an intermediate layer. A cover may be placed over the FG-LWA for covering the FG-LWA. The cover may be a permeable or semi-permeable cover. A layer of soil and/or plants may be placed over the cover (such as, for example, for aesthetic purposes, habitat creation, and/or for the plant roots to aid in water quality amelioration). The FG-LWA may have a bulk density at the second moisture content that is sufficient to maintain buoyancy at the surface of the body of water with the addition of the weight of the cover, soil, and plants. The FG-LWA may comprise a component of a floating wetlands matrix.

Figure 4:
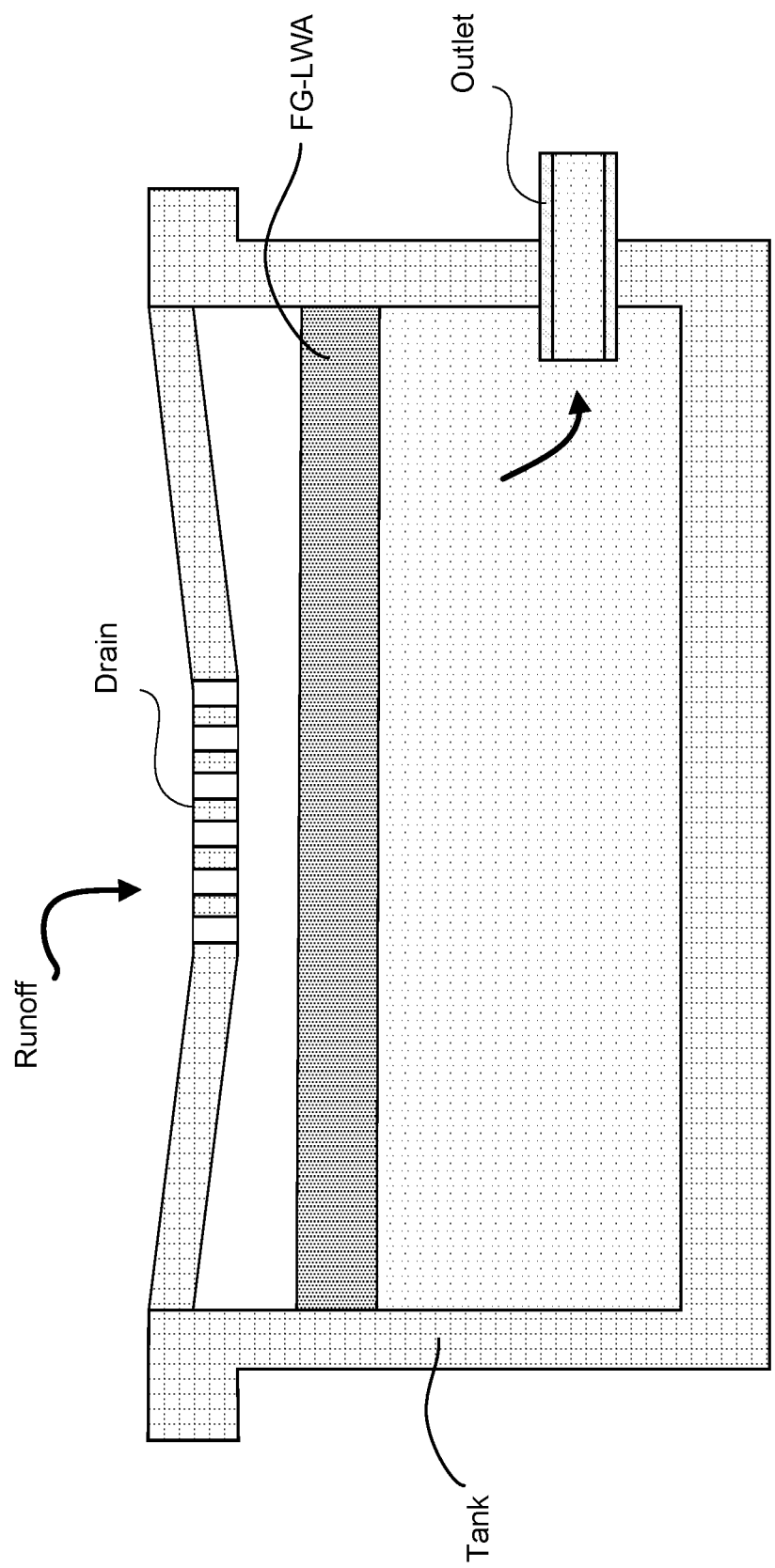
FIG. 4 depicts FG-LWA disposed on a body of water in a storm drain.

FIG. 4 depicts FG-LWA disposed on a body of water in a storm drain. The storm drain may comprise a tank having a drain for allowing runoff (e.g., precipitation, irrigation overflow, commercial water use, etc.) to enter the tank. The tank may have an outlet for allowing water to leave the tank. A layer of FG-LWA may be disposed in the tank. The FG-LWA may act as a filter, for example, the pores of the FG-LWA may entrain hydrocarbons. The FG-LWA may act as an odor control agent, for example, if the water level falls below the outlet and stagnates. The FG-LWA may act as an insect deterring agent, for example, to prevent mosquitoes from laying eggs and/or hatching.

EXAMPLES

Example 1

Recycled glass cullet is cleaned, ground to less than 150 micrometers (US Standard sieve size No. 100), mixed with a foaming agent (e.g., a carbonate foaming agent) in a pug mill, heated, and allowed to fragment from temperature shock. The rate of cooling is related to the final particle size (e.g., rapid cooling leads to a relatively finer particle size distribution). The resulting FG-LWA is cellular/vesicular. After sample preparation, the initial moisture content is measured following ASTM D2216 (2010), grain size distributions are determined following ASTM C136/136M (2006) and the initial bulk density is measured following ASTM C127 (2012a) on the FG-LWA. The average moisture content is determined to be 1.06% and the average bulk density is determined to be 227.2 kg/m3 (14.2 pcf). Sieve analyses are performed following the dry sieving method on the FG-LWA. Particle size ranges from 10 to 30 mm (0.39 to 1.18 in) but is a very uniformly graded material.

Example 2

Recycled glass cullet is cleaned, ground, mixed with a foaming agent, heated, and allowed to fragment from temperature shock. The resulting FG-LWA is cellular/vesicular (foaming creates a thin wall of glass around each gas bubble). By volume, FG-LWA is approximately 92% gas bubbles and 8% glass. The water content (per ASTM D 2216) of FG-LWA will change with time due to the cellular nature of the material as the exterior ruptured pores are filled with water and varies from 2% (when contacting water) to 38% after being completely submerged for several days.

The invention claimed is:

1. A method of vaporization suppression, comprising,
   placing, on a body of water a layer of loose particles of foam glass aggregates,
   wherein the foam glass aggregates in contact with the water have a first moisture content when placed and a second moisture content at equilibrium,
   wherein the second moisture content is greater than the first moisture content, and
   wherein the foam glass aggregates in contact with the water have a bulk density at the second moisture content that is sufficient to maintain buoyancy at the surface of the body of water.

2. The method of claim 1, wherein the layer of foam glass aggregates covers the entire surface of the body of water.

3. The method of claim 2, wherein the layer of foam glass aggregates prevent vectors from entering the body of water.

4. The method of claim 1, wherein the layer of foam glass aggregates is about 25mm to about 305mm thick.

5. The method of claim 4, wherein the layer of foam glass aggregates is about 25mm to about 152mm thick.

6. The method of claim 1, wherein the foam glass aggregates have a particle size of about 5mm to about 80mm.

7. The method of claim 6, wherein the foam glass aggregates have a particle size of about 10mm to about 60mm.

8. The method of claim 1, wherein the foam glass aggregates are permeable to rainfall.

9. The method of claim 1, wherein the foam glass aggregates reduce evaporation.

10. The method of claim 1, wherein the foam glass aggregates prevent algae growth.

11. The method of claim 1, wherein the body of water is a lagoon for waste retention, an agricultural run-off area, or water storage reservoir.

12. The method of claim 1, wherein the foam glass aggregates provide odor control.

13. The method of claim 1, wherein the foam glass aggregates have a bulk density of about 120 kg/m$^3$ to about 400 kg/m$^3$ at the first moisture content.

14. The method of claim 13, wherein the foam glass aggregates have a bulk density of about 170 kg/m$^3$ to about 290 kg/m$^3$ at the first moisture content.

15. The method of claim 13, wherein the foam glass aggregates have a bulk density of about 200 kg/m$^3$ to about 240 kg/m$^3$ at the first moisture content.

16. The method of claim 1, wherein the foam glass aggregates are prepared from a recycled glass cullet.

17. The method of claim 1, wherein the foam glass aggregates in contact with the water have pores to support growth of microbes and bacteria.

18. The method of claim 1, further comprising incorporating a water treatment media with the foam glass aggregates.

19. A method of vaporization suppression, comprising,
   placing, on a body of water, a layer of foam glass aggregates,
   wherein the foam glass aggregates in contact with the water have a first moisture content when placed and a second moisture content at equilibrium,
   wherein the second moisture content is greater than the first moisture content, and
   wherein the foam glass aggregates in contact with the water have a bulk density at the second moisture content that is sufficient to maintain buoyancy at the surface of the body of water; and
   providing a cover for covering the foam glass aggregates, the foam glass aggregates in contact with the water having a bulk density at the second moisture content that is sufficient to maintain buoyancy at the surface of the body of water with the addition of a weight of the cover.

20. A method of vaporization suppression upon an aqueous body, comprising,
   placing, on the aqueous body, a layer comprising loose fragments of foam glass aggregates,
   wherein the foam glass aggregates have a bulk density that is sufficient to maintain buoyancy at the surface of the aqueous body.

* * * * *